(12) United States Patent
Marutzky (10) Patent No.: US 12,337,972 B2
(45) Date of Patent: Jun. 24, 2025

(54) TRACKING SYSTEM FOR AN AIRCRAFT SEAT

(71) Applicant: AMI Industries, Inc., Colorado Springs, CO (US)

(72) Inventor: Kyler J. Marutzky, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 22 days.

(21) Appl. No.: 18/218,423

(22) Filed: Jul. 5, 2023

(65) Prior Publication Data

US 2024/0025549 A1    Jan. 25, 2024

Related U.S. Application Data

(60) Provisional application No. 63/392,011, filed on Jul. 25, 2022.

(51) Int. Cl.
     *B64D 11/06*      (2006.01)
     *B60N 2/015*      (2006.01)

(52) U.S. Cl.
     CPC ...... *B64D 11/0696* (2013.01); *B60N 2/01575* (2013.01); *B60N 2/01591* (2013.01); *B64D 11/0648* (2014.12)

(58) Field of Classification Search
     CPC ...... B64D 11/0696; B64D 9/00; B64D 9/003; B64D 2009/006; B64D 11/0648; B60N 2/01575; B60N 2/01591
     USPC ...................................................... 248/503.1
     See application file for complete search history.

(56) References Cited

U.S. PATENT DOCUMENTS

| | | | |
|---|---|---|---|
| 2,669,284 A | 2/1954 | Pall et al. | |
| 4,062,298 A | 12/1977 | Weik | |
| 4,157,797 A | 6/1979 | Fox | |
| 4,183,493 A * | 1/1980 | Koutsky | B60N 2/0856 248/430 |
| 4,493,470 A | 1/1985 | Engel | |
| 5,131,606 A * | 7/1992 | Nordstrom | B64D 9/003 244/137.1 |
| 5,785,292 A * | 7/1998 | Muraishi | B60N 2/0715 248/432 |
| 5,871,318 A | 2/1999 | Dixon et al. | |

(Continued)

FOREIGN PATENT DOCUMENTS

| | | | | |
|---|---|---|---|---|
| CA | 2823551 A1 * | 2/2014 | ............. | B60N 2/427 |
| DE | 202005012828 U1 * | 3/2006 | ......... | B60N 2/01541 |

(Continued)

OTHER PUBLICATIONS

Extended European Search Report dated Dec. 4, 2023; European Application No. 23187604.6.

(Continued)

*Primary Examiner* — Taylor Morris
(74) *Attorney, Agent, or Firm* — Suiter Swantz IP (57) ABSTRACT

An aircraft seat may include an integrated tracking system. The tracking system may include at least one track foot and one or more roller bearings. The track foot may include one or more axles and be able to interface with a portion of an aircraft seat track. The one or more roller bearings may be coupled to the one or more axles of the track foot and interface with a top surface of the aircraft seat track to aid in the translation of the aircraft seat.

13 Claims, 13 Drawing Sheets

(56) References Cited

U.S. PATENT DOCUMENTS

| | | | | |
|---|---|---|---|---|
| 6,059,345 | A * | 5/2000 | Yokota | B60N 2/06 297/331 |
| 6,260,813 | B1 * | 7/2001 | Whitcomb | B64D 11/0696 244/118.6 |
| 6,488,250 | B1 * | 12/2002 | Munch | B60N 2/0747 297/344.1 |
| 7,520,090 | B2 * | 4/2009 | Gerhart | E05D 15/0665 49/411 |
| 7,637,705 | B2 | 12/2009 | Girardin et al. | |
| 8,920,085 | B2 | 12/2014 | Hudson et al. | |
| 9,051,053 | B2 * | 6/2015 | Ward | B64D 11/06 |
| 9,114,729 | B2 * | 8/2015 | Kinzer | B60N 2/015 |
| 9,150,141 | B2 * | 10/2015 | Daouk | B60P 7/0815 |
| 9,663,232 | B1 * | 5/2017 | Porter | B60N 2/01566 |
| 9,896,001 | B1 * | 2/2018 | Brodish | A47C 3/18 |
| 9,919,624 | B2 | 3/2018 | Cziomer et al. | |
| 10,005,558 | B2 | 6/2018 | Cailleteau | |
| 10,569,669 | B2 | 2/2020 | Dry et al. | |
| 10,583,926 | B2 * | 3/2020 | Erhel | B60N 2/14 |
| 10,787,263 | B2 | 9/2020 | Jacobson et al. | |
| 10,801,546 | B2 * | 10/2020 | Pallini | F16C 19/16 |
| 10,829,225 | B2 | 11/2020 | Doughty et al. | |
| 11,040,639 | B2 * | 6/2021 | Condamin | B60N 2/20 |
| 11,358,497 | B2 * | 6/2022 | Moulin | B60N 2/0806 |
| 2006/0263164 | A1 | 11/2006 | Dowty et al. | |
| 2011/0133030 | A1 * | 6/2011 | Kennedy | B64D 11/0649 244/118.5 |
| 2014/0191081 | A1 * | 7/2014 | Ward | B64D 11/0619 248/429 |
| 2018/0327097 | A1 * | 11/2018 | Loose | B64C 1/20 |
| 2019/0345963 | A1 | 11/2019 | Mochizuki et al. | |
| 2020/0307806 | A1 * | 10/2020 | Wilcynski | B64D 11/0639 |
| 2021/0261170 | A1 | 8/2021 | Moulin | |
| 2022/0025918 | A1 | 1/2022 | Head et al. | |
| 2022/0032821 | A1 | 2/2022 | Parker et al. | |

FOREIGN PATENT DOCUMENTS

| | | | | |
|---|---|---|---|---|
| DE | 102004060718 | A1 * | 6/2006 | B60N 2/01541 |
| DE | 102006022032 | A1 | 12/2006 | |
| DE | 102005023007 | B3 * | 1/2007 | B60N 2/01575 |
| DE | 102010017038 | A1 * | 2/2011 | B60N 2/01525 |
| DE | 102010055364 | A1 * | 6/2012 | B60N 2/015 |
| DE | 10229385 | B4 * | 9/2016 | B60N 2/01525 |
| DE | 102017109669 | A1 * | 11/2018 | |
| EP | 0215495 | A2 | 5/1991 | |
| EP | 2295318 | B1 | 7/2012 | |
| EP | 2445786 | B1 | 11/2013 | |
| EP | 3301022 | A1 * | 4/2018 | A47C 3/18 |
| EP | 3322642 | B1 | 10/2020 | |
| EP | 3626618 | A1 | 10/2022 | |
| FR | 2864481 | A1 * | 7/2005 | B60N 2/01525 |
| FR | 3111330 | A1 * | 12/2021 | |
| GB | 2426549 | B | 3/2010 | |
| GB | 2594016 | A * | 10/2021 | B60N 2/005 |
| KR | 19990020423 | U | 6/1999 | |
| WO | WO-2014110403 | A1 * | 7/2014 | B64D 11/06 |
| WO | 2015198278 | A1 | 12/2015 | |
| WO | WO-2016049356 | A1 * | 3/2016 | B60N 2/06 |
| WO | WO-2019115590 | A1 * | 6/2019 | B60N 2/005 |
| WO | WO-2022075968 | A1 * | 4/2022 | B60N 2/01575 |

OTHER PUBLICATIONS

Extended European Search Report dated Nov. 30, 2023, European Application No. 23187573.3.

* cited by examiner

TRACKING SYSTEM FOR AN AIRCRAFT SEAT

CROSS-REFERENCE TO RELATED APPLICATION

The present application claims the benefit under 35 U.S.C. § 119(e) of U.S. Provisional Application Ser. No. 63/392,011, filed Jul. 25, 2022, which is incorporated herein by reference in the entirety.

TECHNICAL FIELD

The present invention generally relates to an aircraft seat translating system, and, more particularly, to an aircraft seat translating system coupled to one or more floor tracks of the aircraft.

BACKGROUND

Modern aircraft seats are typically equipped with adjustable seating systems which may be configured for adjustment of the aircraft seat based on a user preference. For example, a passenger or a crew member may desire for their respective aircraft seat to include adjustable features such as a tracking position of the aircraft seat. However, such adjustable seating systems often include separately positioned track feet and rollers which creates an unnecessary competition for space and negatively impacts the stability of the rollers, degrees of freedom, and translation of the tracking system.

Additionally, aircraft seats may be configured to attach to a floor track of the aircraft via countersink attachments (e.g., countersink screws). In general, the rollers may be positioned within the center of the track and biased towards a middle portion of the aircraft seat structure, which may cause the rollers to bounce off the attachment countersinks during translation. This configuration may also constrain the degrees of freedom available during a track roll and create an imbalance or rocking movement. Therefore, it would be advantageous to provide a system which cures one or more of the shortcomings described above.

SUMMARY

A tracking system for an aircraft seat is disclosed, in accordance with one or more embodiments of the present disclosure. In some embodiments, the tracking system may include a track foot. In some embodiments, the track foot may include one or more axles configured to interface with a portion of a track of the aircraft seat. In some embodiments, the tracking system may include one or more roller bearings. In some embodiments, the one or more roller bearings may be configured to couple to the one or more axles of the track foot. In some embodiments, the one or more roller bearings may be configured to interface with a top surface of the track of the aircraft seat.

An aircraft seat is disclosed, in accordance with one or more embodiments of the present disclosure. In some embodiments, the aircraft seat may include a seat structure positioned beneath the aircraft seat and configured to couple the aircraft seat to a track. In some embodiments, the track may be configured to fix itself to the floor of an aircraft. In some embodiments, the aircraft seat may include a plurality of tracking systems. In some embodiments, each tracking system may be coupled to an outer corner portion of the seat structure. In some embodiments, each tracking system may include a track foot. In some embodiments, the track foot may include one or more axles configured to interface with a portion of a track of the aircraft seat. In some embodiments, each tracking system may include one or more roller bearings. In some embodiments, the one or more roller bearings may be configured to couple to the one or more axles of the track foot. In some embodiments, the one or more roller bearings may be configured to interface with a top surface of the track of the aircraft seat This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Figure 1:
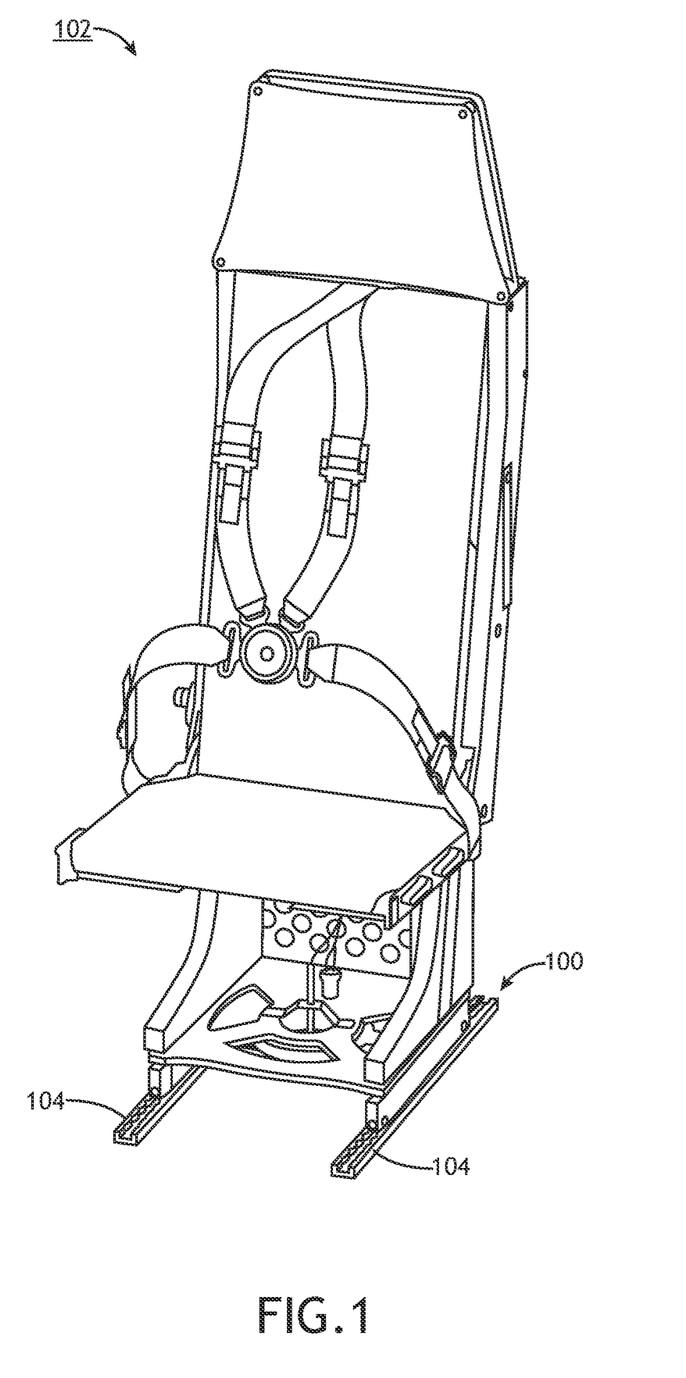
FIG. 1 is a perspective view of an aircraft seat illustrating an integrated tracking system, in accordance with one or more embodiments of the disclosure.
Figure 2:
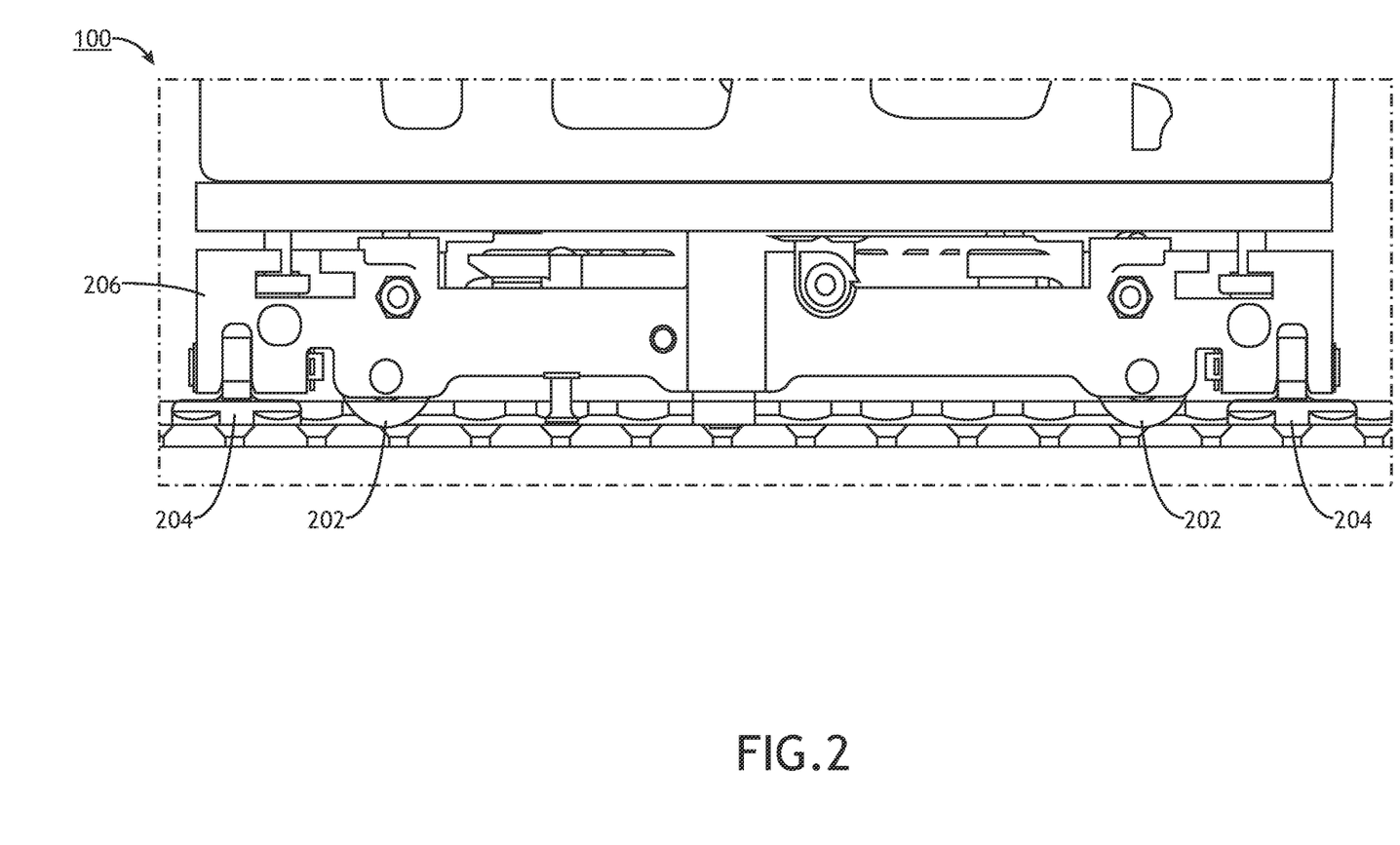
FIG. 2 is a side view of an aircraft seat tracking system illustrating roller bearings disposed through the center of the floor track and separated from the track foot, in accordance with one or more embodiments of the disclosure.
Figure 3:
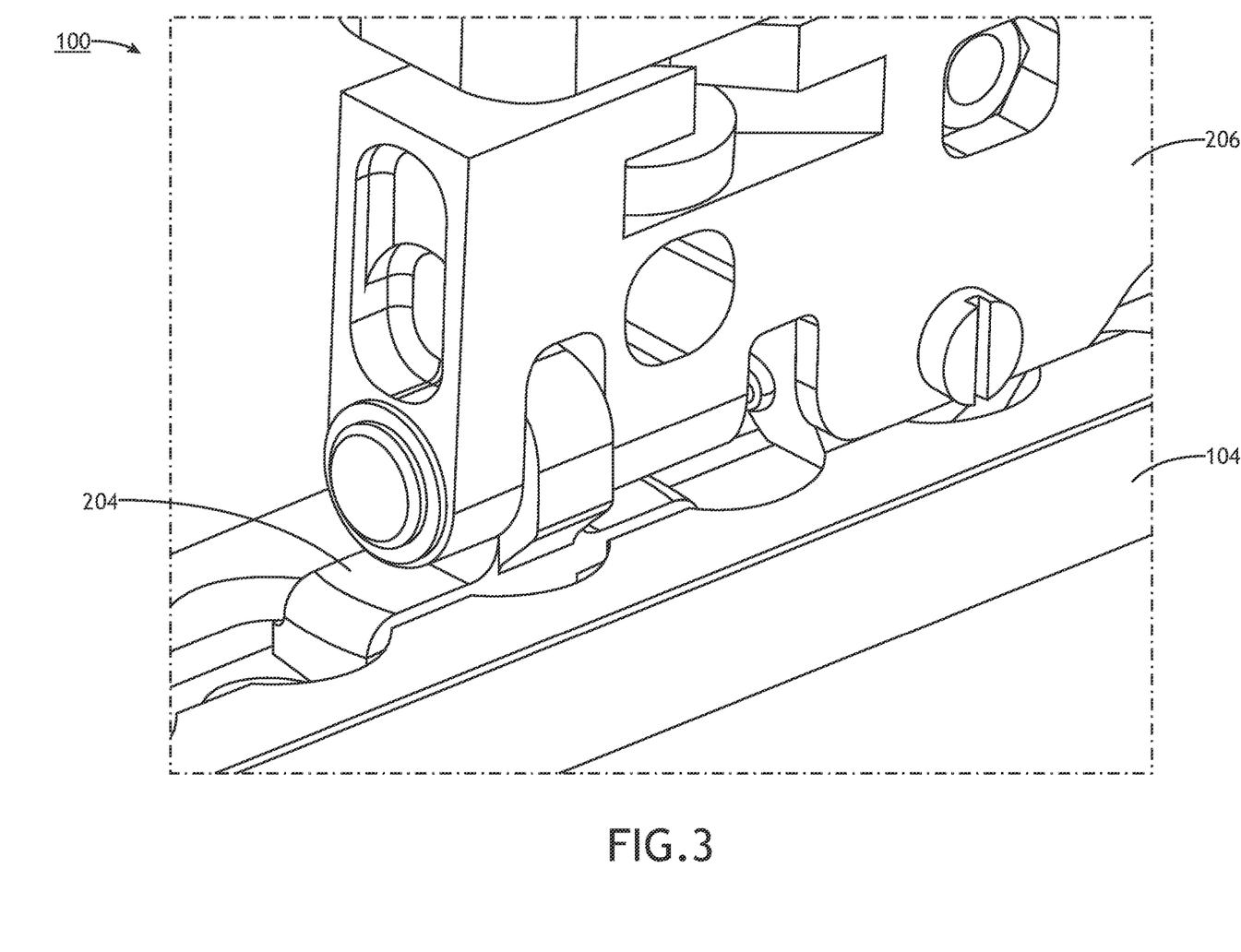
FIG. 3 is a perspective view of an aircraft seat tracking system illustrating roller bearings disposed through the center of the floor track, in accordance with one or more embodiments of the disclosure.
Figure 4A:
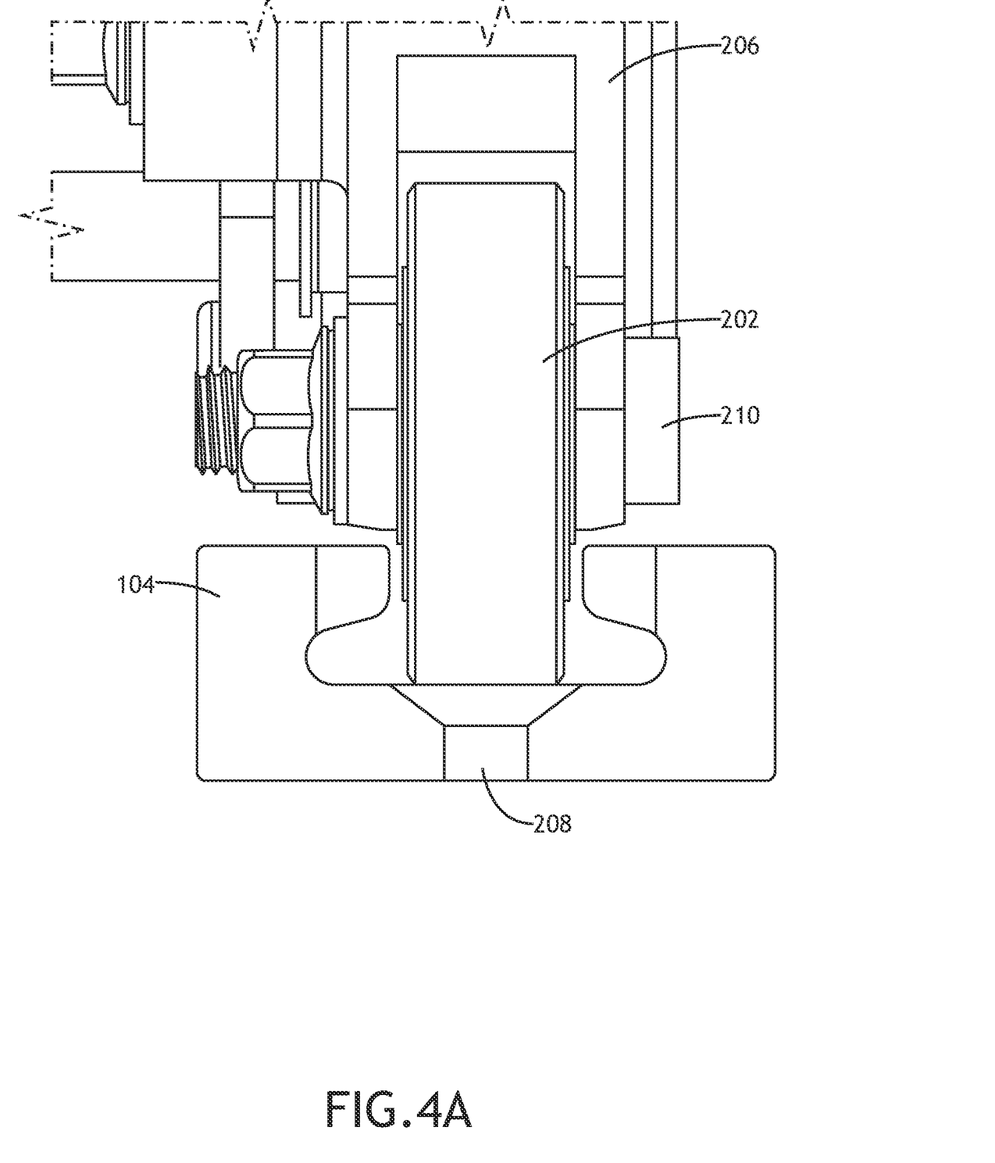
FIGS. 4A-4B are front views of an aircraft tracking system including one or more rollers disposed within a central slot of the floor track, in accordance with one or more embodiments of the disclosure.
Figure 4B:
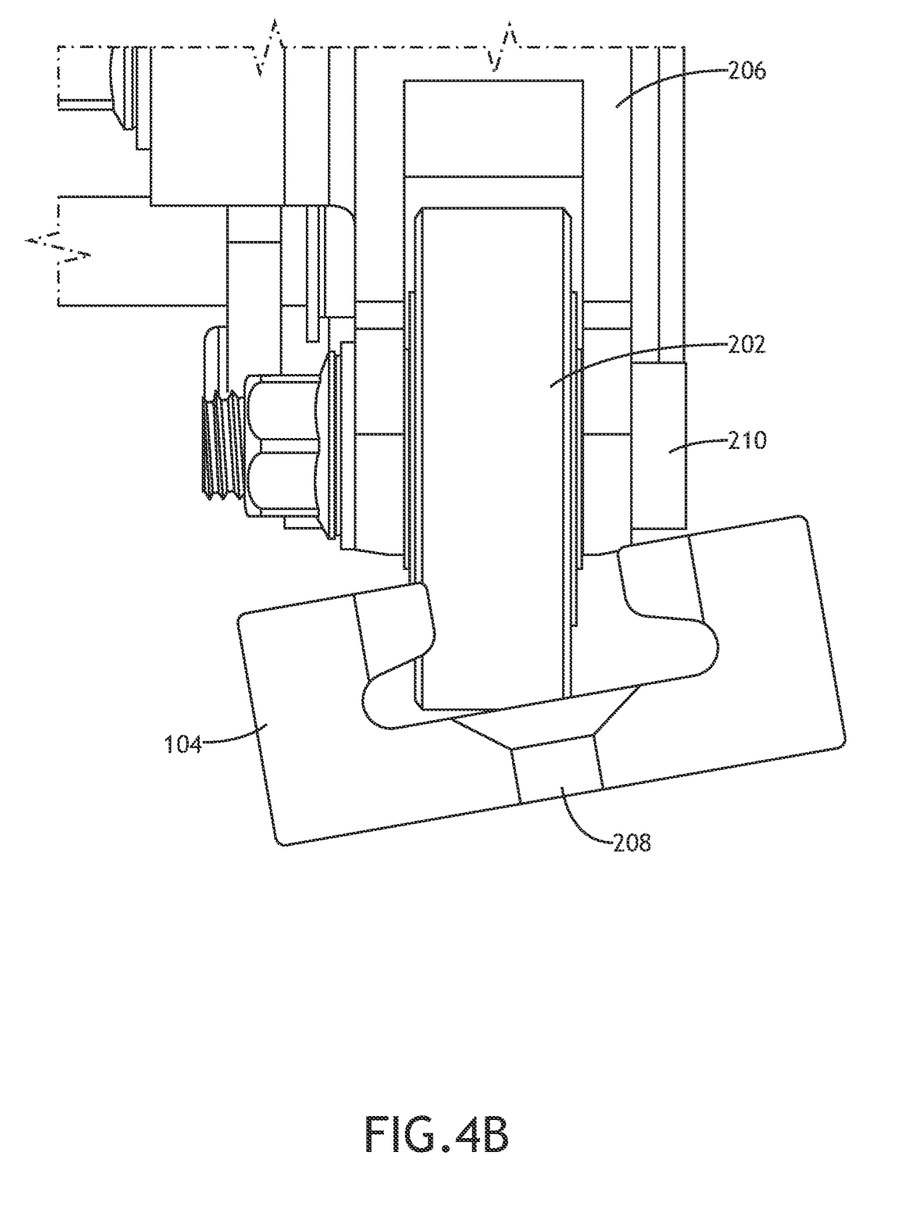
Figure 5:
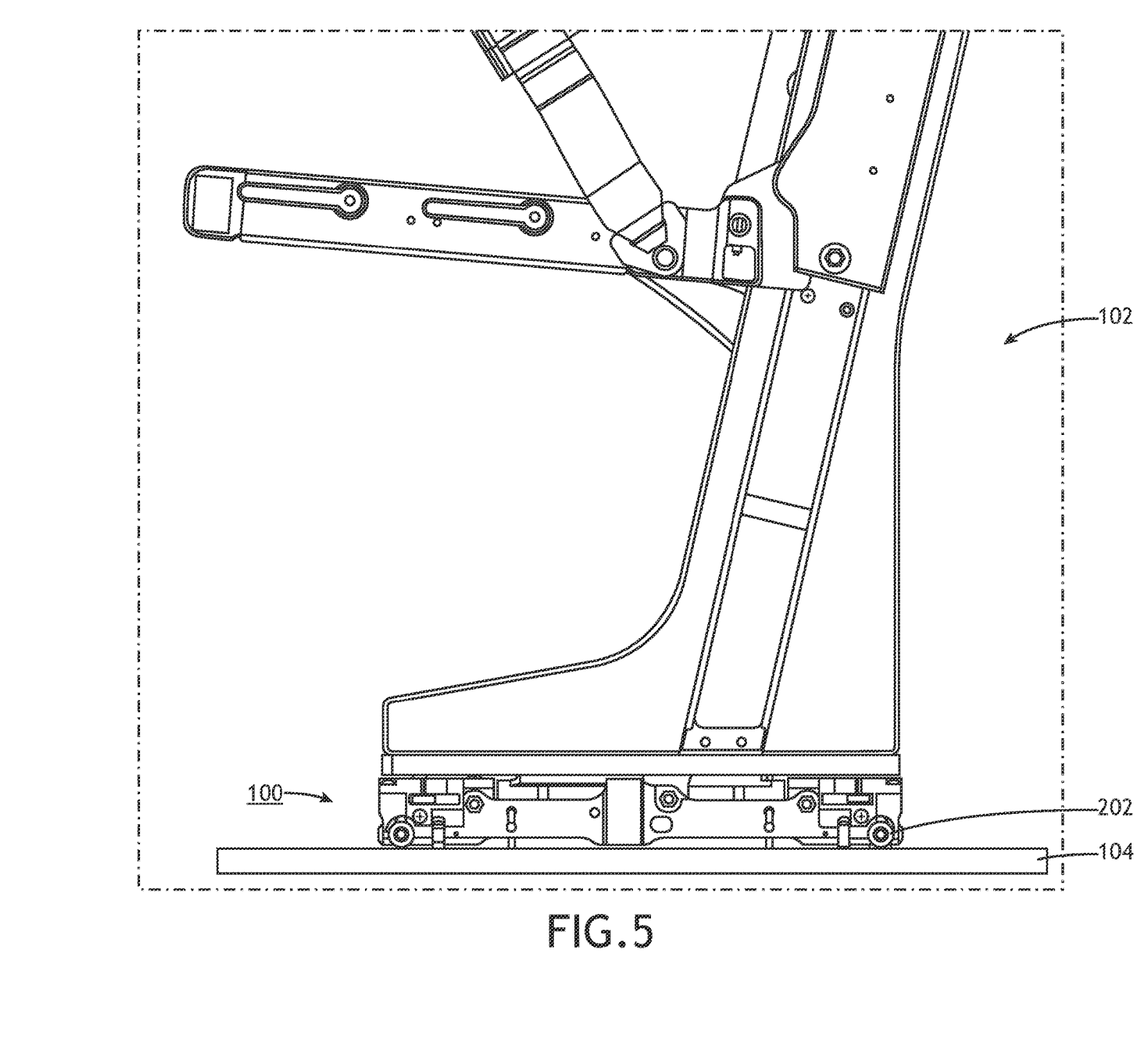
FIG. 5 is a side view of a bottom portion of an aircraft seat illustrating an integrated tracking system, in accordance with one or more embodiments of the disclosure.
Figure 6:
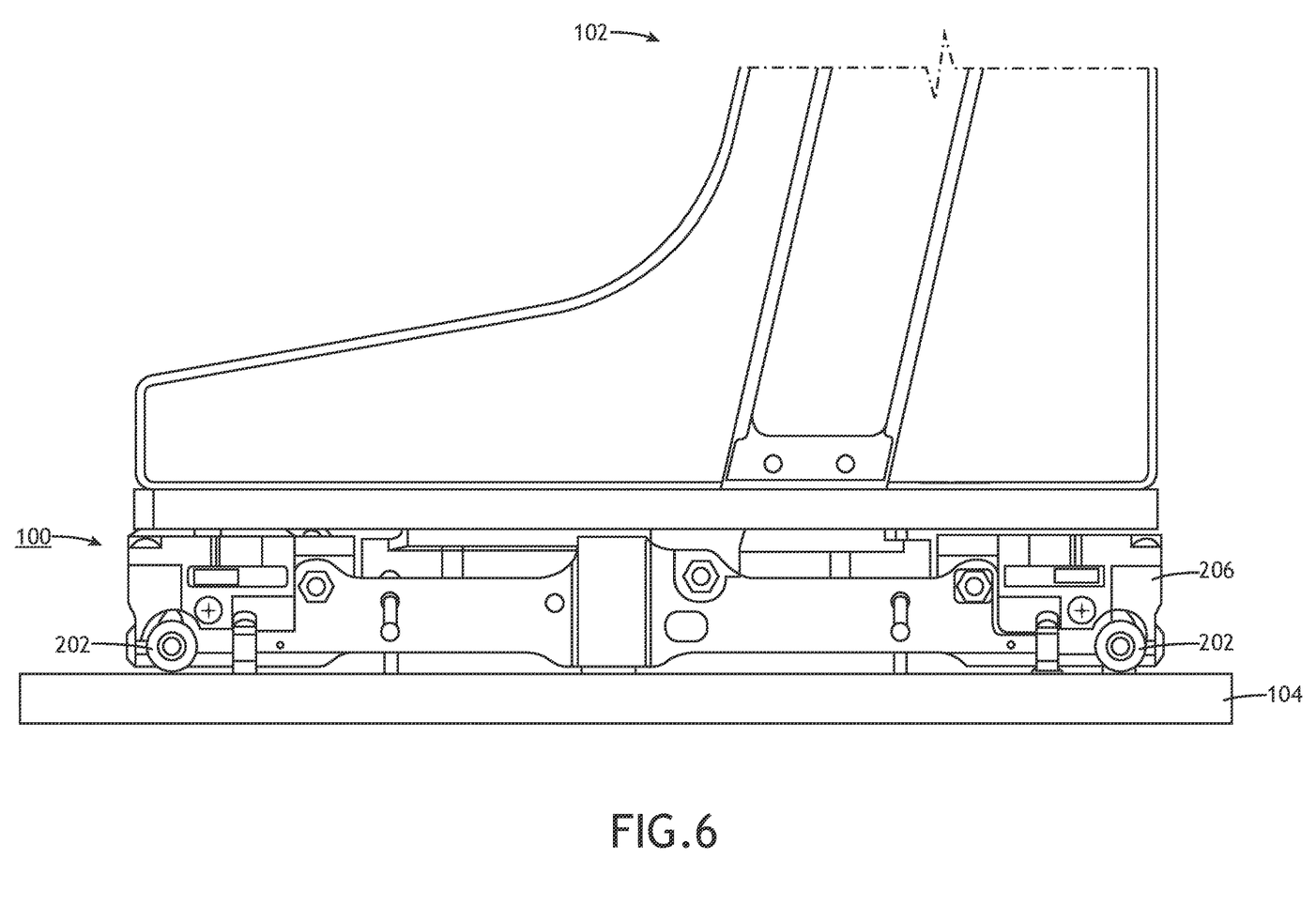
FIG. 6 is a side view of a bottom portion of an aircraft seat illustrating an integrated tracking system, in accordance with one or more embodiments of the disclosure.

Referring now to FIG. 1, a perspective view of an aircraft seat 102 illustrating an integrated tracking system 100 is shown, in accordance with one or more embodiments of the disclosure. The aircraft seat 102 may include a seat frame, a seatpan, a seatback, one or more armrests, a headrest, and/or a tracking system 100. It is noted herein that the aircraft seat 102 depicted in the figures is not limited to the specific structures or features shown, however, the aircraft seat 102 is illustrated with an intent to exemplify how the tracking system 100 would integrate within an aircraft seat 102. It is further noted that the tracking system 100 may be configured to integrate with any aircraft seat 102 type known in the art.

In some embodiments, the seat frame may be fixed to the floor of a passenger cabin (e.g., set by track fittings into one or more tracks 104 extending through a passenger cabin). In some embodiments, the seat frame may be attached to the cabin floor (e.g., set into the track fittings) by one or more additional mechanisms allowing the seat frame to translate (e.g., laterally and/or longitudinally) and/or rotate (e.g., swivel) relative to the cabin floor. In either case, the movement of the seat pan, seatback, and/or headrest relative to the seat frame is unaffected.

Aircraft seats installed within an avionics environment may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

It is often desirable to adjust the configuration of the aircraft seat 102. For example, a passenger or crew member may wish to adjust at least the tracking position of the aircraft seat 102. Referring now to FIGS. 2-4B, an exemplary embodiment of an aircraft seat tracking system 100 illustrating roller bearings 202 disposed through the center of the floor track 104 and separated from the track foot 204, in accordance with one or more embodiments of the present disclosure. Disposing the roller bearings 202 through the center of the floor track 104 and separating them from the track foot 204, as shown in FIGS. 2-4B, may have one or more drawbacks related to the performance of the tracking system 100 during translation. For example, the roller bearings 202 may bounce off the countersink attachments 208 in the center of the track 104 causing discomfort to the user. By way of another example, the roller bearings 202 have zero degrees of freedom to allow for compliance when the aircraft seat 102 is "rolled" during dynamic/static testing, therefore, causing binding and an increase in floor loads. Further, due to a buildup of tolerances, additional components may be required so that the roller bearings 202 may be adjusted vertically to position the track feet 204 properly within the tracks 104. Positioning of the roller bearings 202 can play a critical role in the stability of the tracking system 100. For example, such systems as mentioned above, may include roller bearings 202 positioned more towards the center of the aircraft seat 102; therefore, the aircraft seat 102 is less stable and prone to rocking during translation.

As such, it would be desirable to provide a tracking system 100 for an aircraft seat 102 configured to address one or more shortcomings of the approaches described above. The tracking system 100 should be configured to enhance stability during translation. For example, the system 100 may include one or more roller bearings 202 placed at the outer most portions of a seat structure 206. The system should provide smooth translation for the aircraft seat 102. For example, the system 100 may include one or more roller bearings 202 positioned on top of the track 104 rather than in the center slot of the track 104. The system 100 should reduce the number of necessary parts. For example, a roller bearing vertical adjustment feature 210 may no longer be required due to a shortened tolerance stack. Furthermore, the system 100 should eliminate binding. For example, the system 100 may include one or more roller bearings 202 attached to a track foot 204 which may be configured to pivot as the aircraft seat 102 is rolled.

Referring now to FIGS. 5-11B, an aircraft tracking system 100 including one or more rollers 202 disposed on a top surface of the floor track 104 and combined with the track foot 204 is illustrated, in accordance with one or more embodiments of the disclosure. In some embodiments, the aircraft tracking system 100 may include a track foot 204. The track foot 204 may be configured to provide an interface to the aircraft and translate aircraft seat 102 loads to the aircraft during a dynamic event. For example, the track foot 204 may include at least one of a track foot body, one or more clevis features 218, and/or one or more axles 216. It is noted herein that at least one of the track foot body, the one or more clevis features 218, and/or the one or more axles 216 may be configured as a single machined component rather than separate parts. The one or more clevis features 218 of the track foot 204 may be configured to extend in a vertical direction with respect to the floor of the aircraft. In an exemplary embodiment, the track foot 204 may include two adjacently positioned clevis features 218. Each of the two adjacently positioned clevis features 218 may include an axle 216 attached on opposite facing sides of the two adjacently positioned clevis features 218.

In some embodiments, the track foot 204 may be configured to interface with a portion of the floor track 104. For example, the body of the track foot 204 may be disposed within a central cavity of the floor track 104 and configured to translate along the floor track 104 to reach a desired position. The floor track 104 may include one or more slots configured for attachment with the track foot 204. During translation, the track foot 204 may be secured into a desired position via the one or more slots provided throughout the floor track 104.

Figure 7:
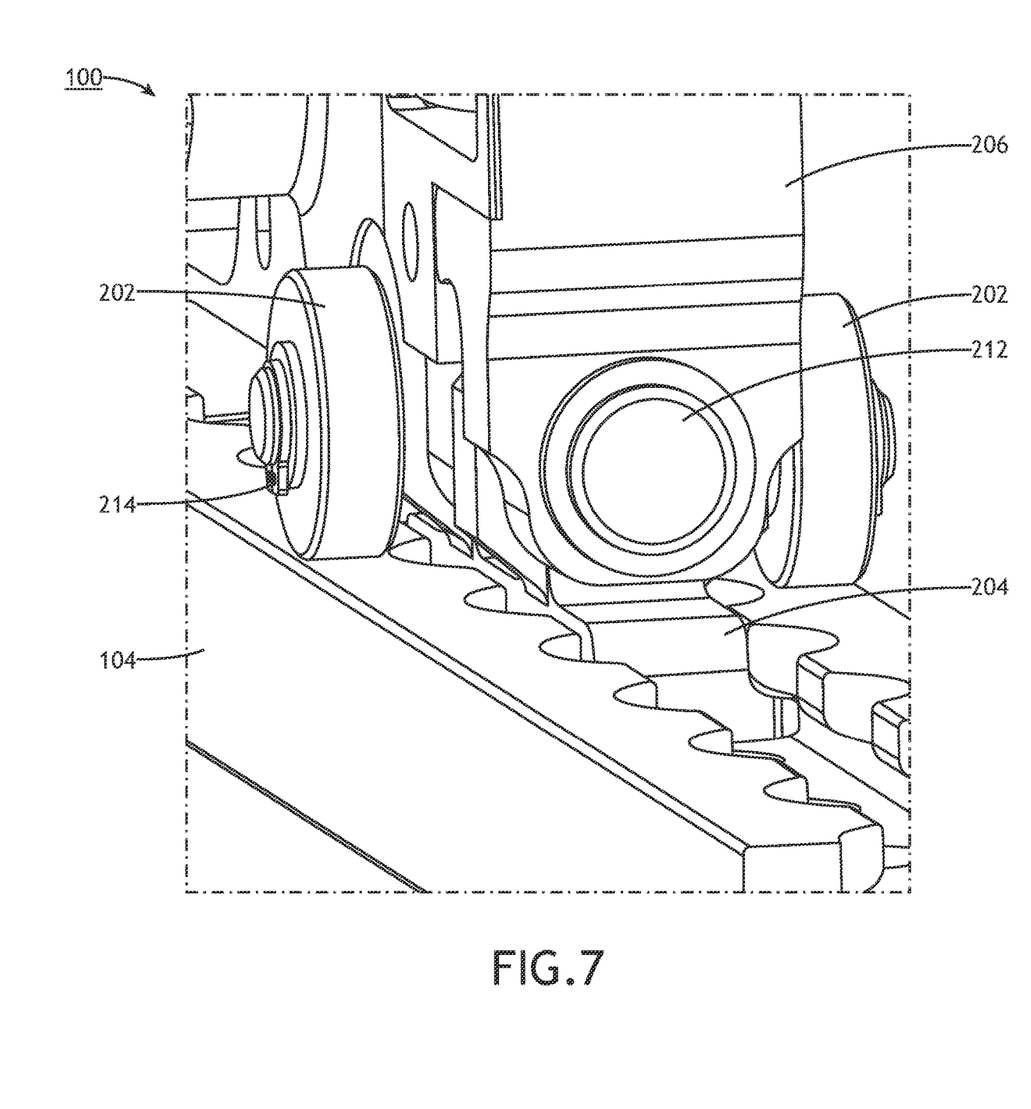
FIG. 7 is a perspective view of a tracking system for an aircraft seat coupled to a portion of a floor track, in accordance with one or more embodiments of the disclosure.
Figure 8:
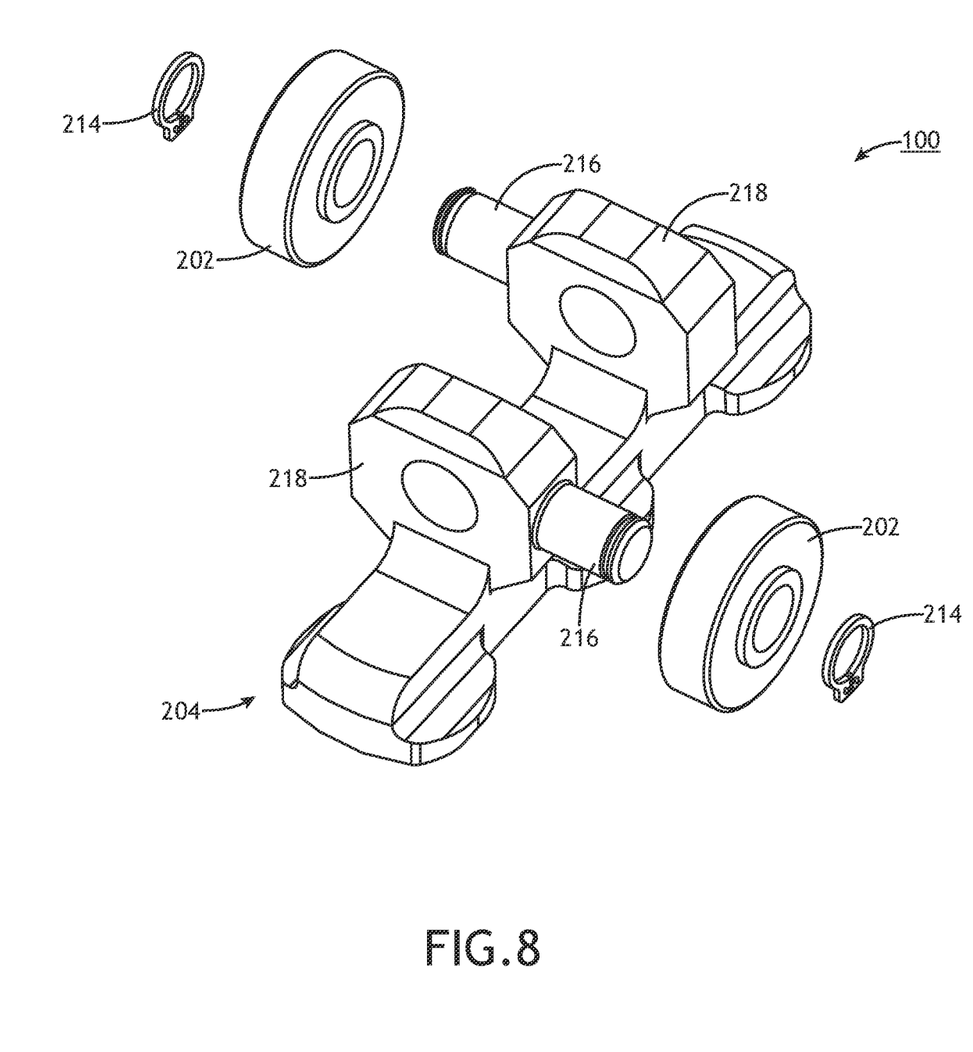
FIG. 8 is an exploded view of the tracking system illustrating one or more rollers coupled to the track foot, in accordance with one or more embodiments of the disclosure.
Figure 9:
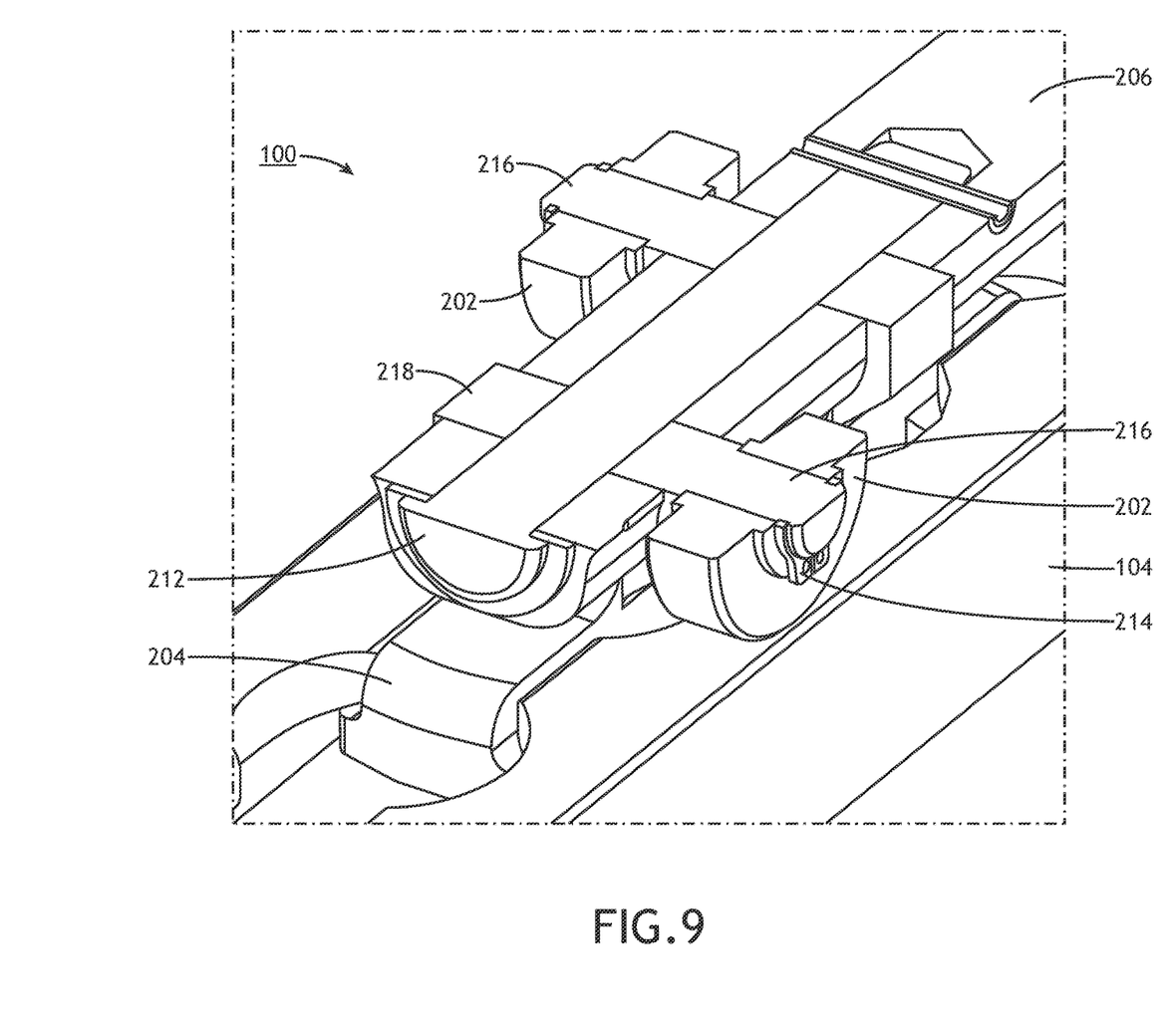
FIG. 9 is a partial cross-sectional view of an aircraft tracking system illustrating a pin configured to secure the track foot to an aircraft seat structure, in accordance with one or more embodiments of the disclosure.
Figure 10:
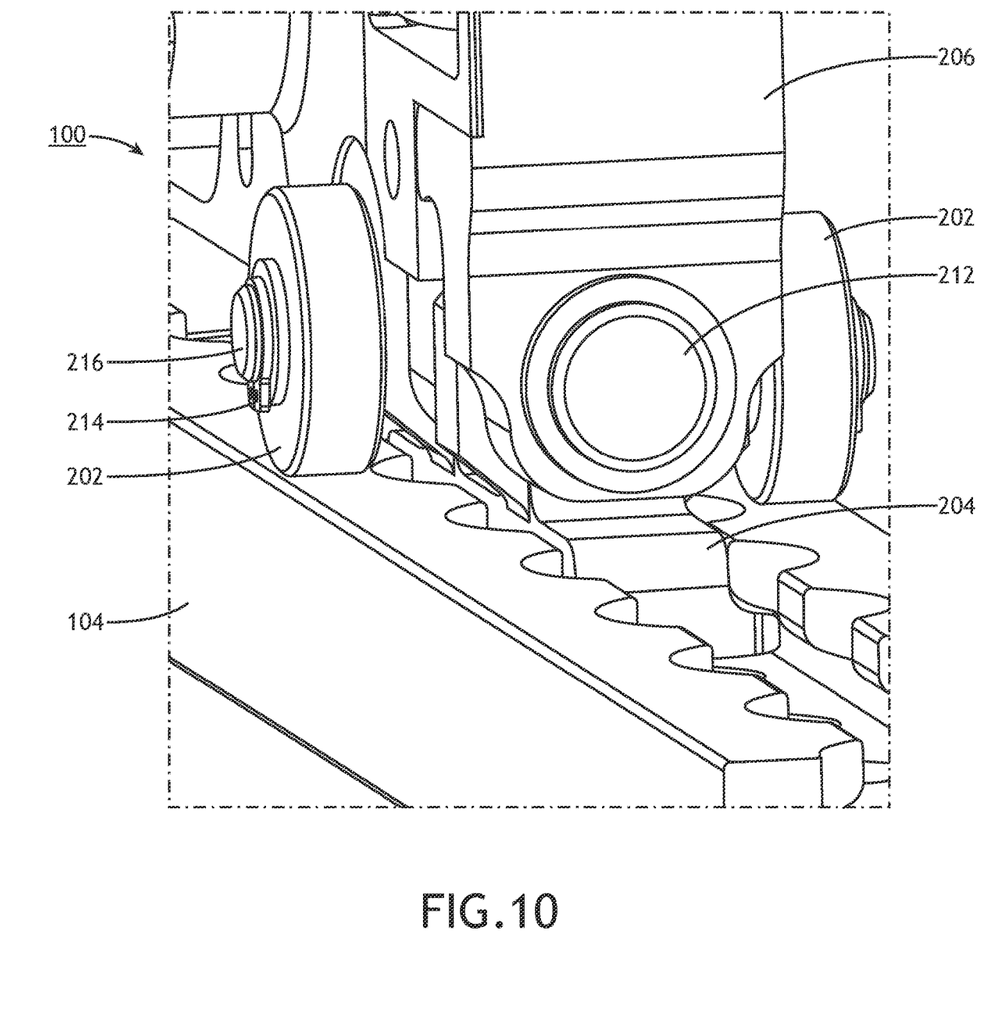
FIG. 10 is a perspective view of a tracking system for an aircraft seat coupled to a portion of a floor track, in accordance with one or more embodiments of the disclosure.
Figure 11A:
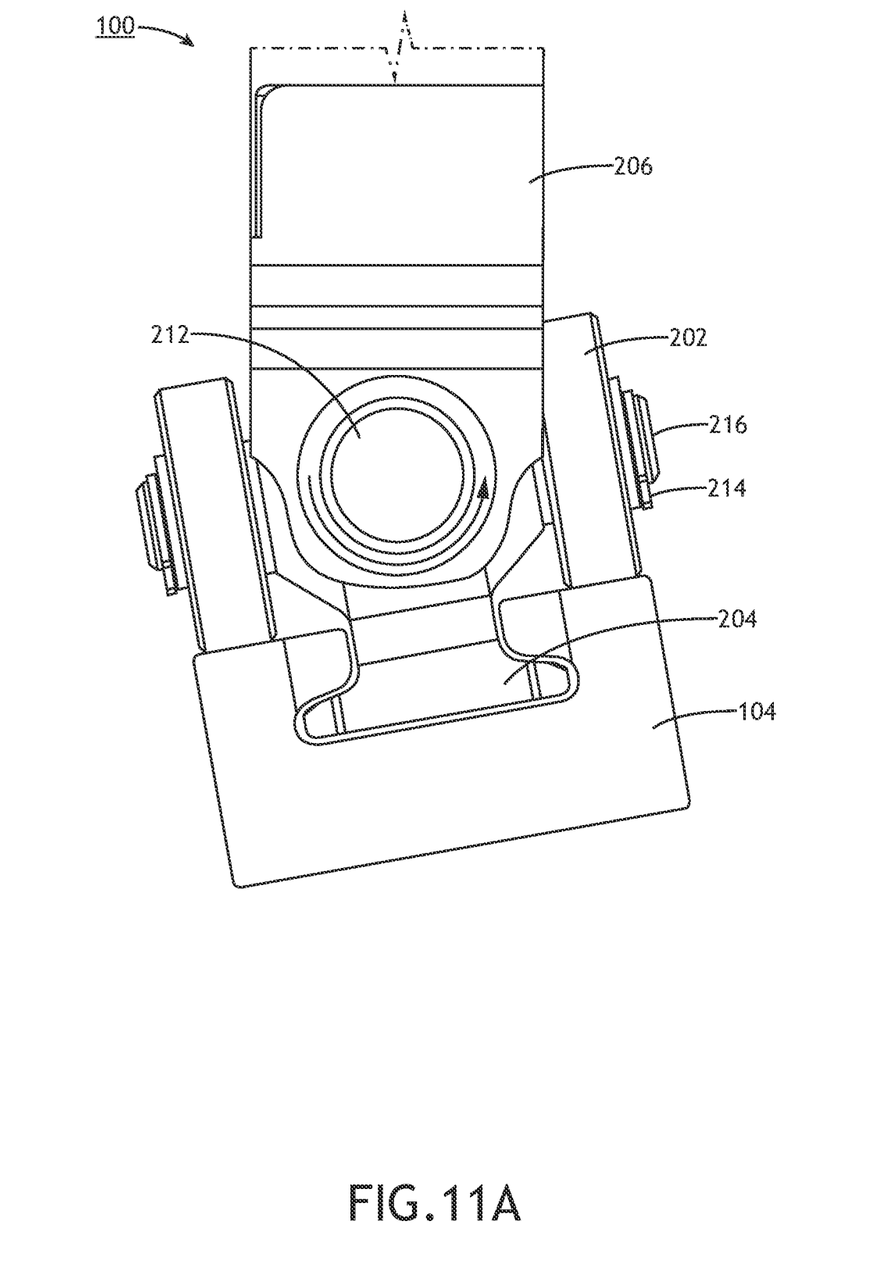
FIGS. 11A-11B are front views of an aircraft tracking system including one or more rollers disposed on a top
Figure 11B:
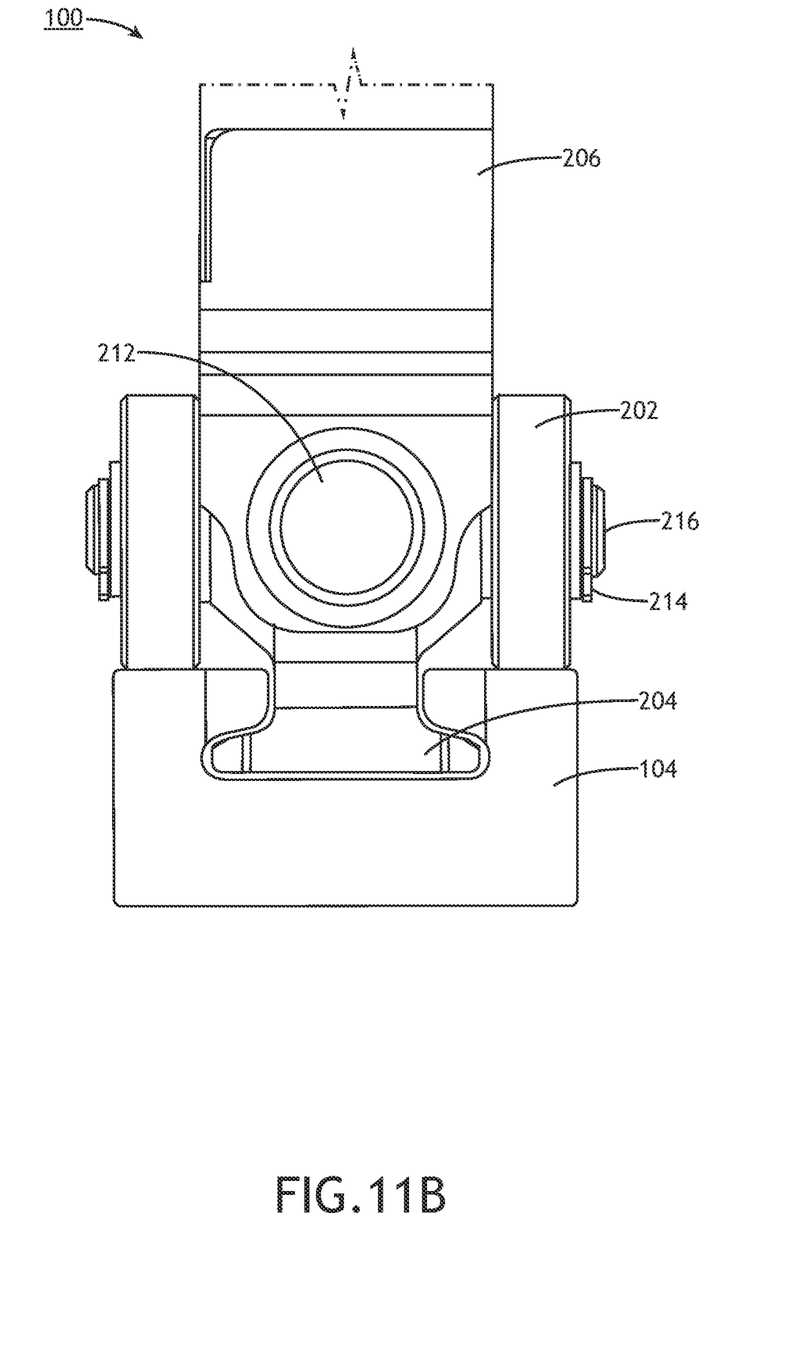

In some embodiments, the tracking system 100 may include one or more roller bearings 202 configured to aid in the translation of the aircraft seat 102 along the floor track 104. For example, the one or more roller bearings 202 may couple to the track foot 204 via the one or more axles 216. By way of another example, the one or more roller bearings 202 may be secured to the one or more axles 216 via one or more retaining clips 214, which may be attached to an end portion of the one or more axles 216. The opposite and adjacent positioning of the one or more roller bearings 202 may help to stabilize the aircraft seat 102 during translation and prevent any unwanted rocking movement. Further, the one or more roller bearings 202 may be configured to interface with a top surface of the floor track 104, as shown in FIGS. 7 and 9.

In some embodiments, the tracking system 100 may be integrated with the aircraft seat 102 by coupling to a seat structure 206 positioned to a bottom portion of the seat frame. For example, the seat structure 206 may serve as a coupling device which provides one or more attachment means to couple with the tracking system 100. In some embodiments, the seat structure 206 may include one or more cavities which are configured to align with the one or more clevis features 218 of the track foot 204. The one or more clevis features 218 of the track foot 204 may be configured to insert within the aligned one or more cavities of the seating structure 206. Further, as shown in FIG. 9, an attachment pin 212 may be inserted through an opening in an end portion of the seat structure 206 and go through the one or more clevis features 218 of the track foot 204, securing the tracking system 100 to the seat structure 206. For instance, the aircraft seat 102 may include a tracking system 100 located at each bottom corner of the aircraft seat 102, and each tracking system 100 may be arranged at the outermost corner of the aircraft seat 102. Although the figures provided illustrate the aircraft seat 102 including four tracking systems 100 installed on the four corners of the seat 102, it is noted that the aircraft seat 102 may include any number and configuration of tracking systems 100. The figures are provided merely for illustrative purposes and shall not be construed as limiting the scope of the present disclosure.

Although embodiments of the disclosure are directed to an aviation environment, it is noted herein the tracking system 100 is not limited to use in an aviation environment. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A tracking system for an aircraft seat, the tracking system comprising:
   a track foot configured to interface with a portion of a track of the aircraft seat, the track foot including two or more clevis features extending in a vertical direction from the track foot, wherein the two or more clevis features include at least a first clevis feature and a second clevis feature, the track foot including two or more axles, the two or more axles including at least a first axle and a second axle, wherein the first axle extends horizontally outward from the first clevis feature in a first direction and the second axle extends horizontally outward from the second clevis feature in a second direction opposite the first direction; and
   two or more roller bearings configured to couple to the two or more axles of the track foot, wherein the two or more roller bearings include at least a first roller bearing configured to couple to the first axle and a second roller bearing configured to couple to the second axle, wherein the first roller bearing and the second roller bearing are coplanar, wherein the first roller bearing is horizontally offset from the second roller bearing by a distance, the two or more roller bearings configured to interface with a top surface of the track of the aircraft seat, wherein the first roller bearing interfaces with a first side of the top surface of the track and the second roller bearing interfaces with a second side of the top surface of the track opposite the first side.

2. The tracking system of claim 1, wherein one or more retaining clips are configured to couple to an end portion of the two or more axles outside of the two or more roller bearings.

3. The tracking system of claim 1, wherein the track foot is rotationally coupled to a seat structure of the aircraft seat via at least one attachment pin such that the track foot is allowed to rotate about the at least one attachment pin in response to the aircraft seat being rolled.

4. The tracking system of claim 3, wherein the two or more clevis features are configured to receive the at least one attachment pin, the at least one attachment pin being configured to insert through a hole in each of the two or more clevis features.

5. The tracking system of claim 1, wherein at least one of the track foot, the two or more clevis features, and the two or more axles are manufactured as a single component.

6. An aircraft seat, the aircraft seat comprising:
a track,
a seat structure positioned beneath the aircraft seat and configured to couple the aircraft seat to the track, the track being configured to fix itself to a floor of an aircraft;
a plurality of tracking systems,
each tracking system coupled to an outer corner portion of the seat structure, each tracking system comprising:
a track foot configured to interface with a portion of the track, the track foot including two or more clevis features extending in a vertical direction from the track foot, wherein the two or more clevis features include at least a first clevis feature and a second clevis feature, the track foot including two or more axles, the two or more axles including at least a first axle and a second axle, wherein the first axle extends horizontally outward from the first clevis feature in a first direction and the second axle extends horizontally outward from the second clevis feature in a second direction opposite the first direction; and
two or more roller bearings configured to couple to the two or more axles of the track foot, wherein the two or more roller bearings include at least a first roller bearing configured to couple to the first axle and a second roller bearing configured to couple to the second axle, wherein the first roller bearing and the second roller bearing are coplanar, wherein the first roller bearing is horizontally offset from the second roller bearing by a distance, the two or more roller bearings configured to interface with a top surface of the portion along the track, wherein the first roller bearing interfaces with a first side of the top surface of the track and the second roller bearing interfaces with a second side of the top surface of the track opposite the first side.

7. The aircraft seat of claim 6, wherein one or more retaining clips are configured to couple to an end portion of the two or more axles outside of the two or more roller bearings.

8. The aircraft seat of claim 6, wherein an outer corner portion of the seat structure includes one or more attachment slots configured to receive at least one attachment pin.

9. The aircraft seat of claim 8, wherein the track foot is rotationally coupled to the seat structure via the at least one attachment pin such that the track foot is allowed to rotate about the at least one attachment pin in response to the aircraft seat being rolled.

10. The aircraft seat of claim 9, wherein the two or more clevis features are configured to receive the at least one attachment pin, the at least one attachment pin being configured to insert through a hole in each of the two or more clevis features.

11. The aircraft seat of claim 6, wherein at least one of the track foot, the two or more clevis features, and the two or more axles are manufactured as a single component.

12. The aircraft seat of claim 6, wherein the track includes one or more attachment slots throughout a length of the track to couple with the track foot.

13. The aircraft seat of claim 6, wherein the seat structure includes four tracking systems of the plurality of tracking systems coupled to each outer corner portion of the seat structure, the four tracking systems being positioned at an outermost portion of each outer corner portion of the seat structure.

* * * * *